(12) United States Patent
Hardwick et al.

(10) Patent No.: US 11,235,886 B2
(45) Date of Patent: Feb. 1, 2022

(54) MONITORING SYSTEM FOR IDENTIFYING AN OPERATING STATE OF A MOTOR

(71) Applicant: Goodrich Actuation Systems Limited, Solihull (GB)

(72) Inventors: Graham Hardwick, Wolverhampton (GB); James Thomas, Wolverhampton (GB); Herve Menaut, Lichfield (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 714 days.

(21) Appl. No.: 16/123,272

(22) Filed: Sep. 6, 2018

(65) Prior Publication Data

US 2019/0118966 A1   Apr. 25, 2019

(30) Foreign Application Priority Data

Oct. 20, 2017   (EP) .................................. 17197542

(51) Int. Cl.
| | |
|---|---|
| *B64D 45/00* | (2006.01) |
| *G05B 23/02* | (2006.01) |
| *B64F 5/60* | (2017.01) |
| *F16H 57/021* | (2012.01) |
| *F16H 57/02* | (2012.01) |
| *F16H 61/12* | (2010.01) |

(52) U.S. Cl.
CPC .......... *B64D 45/0005* (2013.01); *B64F 5/60* (2017.01); *F16H 57/021* (2013.01); *G05B 23/0235* (2013.01); *B64D 2045/0085* (2013.01); *F16H 2057/02082* (2013.01); *F16H 2061/1208* (2013.01)

(58) Field of Classification Search
CPC ........ B64D 45/0005; B64D 2045/0085; B64F 5/60; F16H 57/021; F16H 2057/02082; F16H 2061/1208; G05B 23/0235
See application file for complete search history.

(56) References Cited

U.S. PATENT DOCUMENTS

| | | | | |
|---|---|---|---|---|
| 4,461,254 A | * | 7/1984 | Pfalzgraf ............... | F02D 11/105 123/350 |
| 5,048,482 A | | 9/1991 | Kratt et al. | |
| 5,692,472 A | * | 12/1997 | Bederna ................ | F02D 11/107 123/350 |
| 6,041,757 A | * | 3/2000 | Kadota ................. | F02D 31/005 123/478 |
| 6,263,856 B1 | * | 7/2001 | Weber ................... | F02D 11/105 123/352 |
| 6,711,492 B1 | * | 3/2004 | Pursifull ............... | F02D 11/107 123/399 |

(Continued)

OTHER PUBLICATIONS

Extended European Search Report for International Application No. 17197542.8 dated Apr. 5, 2018, 9 pages.

(Continued)

*Primary Examiner* — David M Fenstermacher
(74) *Attorney, Agent, or Firm* — Cantor Colburn LLP

(57) ABSTRACT

A monitoring system is disclosed for identifying an operating state of a motor, the system comprising: a speed sensor for determining a speed of a motor and providing a speed signal as a function of time in response thereto, and a processor configured to identify a symmetric and/or an asymmetric oscillation of the speed signal as a function of time.

15 Claims, 5 Drawing Sheets

(56) References Cited

U.S. PATENT DOCUMENTS

| | | | | |
|---|---|---|---|---|
| 6,964,192 | B2* | 11/2005 | Bauer | F02D 11/107 |
| | | | | 73/114.15 |
| 7,010,417 | B2* | 3/2006 | Edwards, II | F02D 41/021 |
| | | | | 701/102 |
| 7,194,319 | B2* | 3/2007 | Grossmann | G05B 19/4061 |
| | | | | 123/333 |
| 7,328,686 | B2* | 2/2008 | Cullen | F02D 41/0087 |
| | | | | 123/198 F |
| 9,630,725 | B2 | 4/2017 | Fleddermann et al. | |
| 9,845,741 | B2* | 12/2017 | Sugihira | F02D 37/02 |
| 2017/0254726 | A1 | 9/2017 | Das et al. | |
| 2017/0293862 | A1 | 10/2017 | Kamiya et al. | |

OTHER PUBLICATIONS

Tong Wei: 1 Introduction to Electric Motors:, Jan. 31, 2014, CRC Press, Boca Raton, London, New York, pp. 1-82.

\* cited by examiner

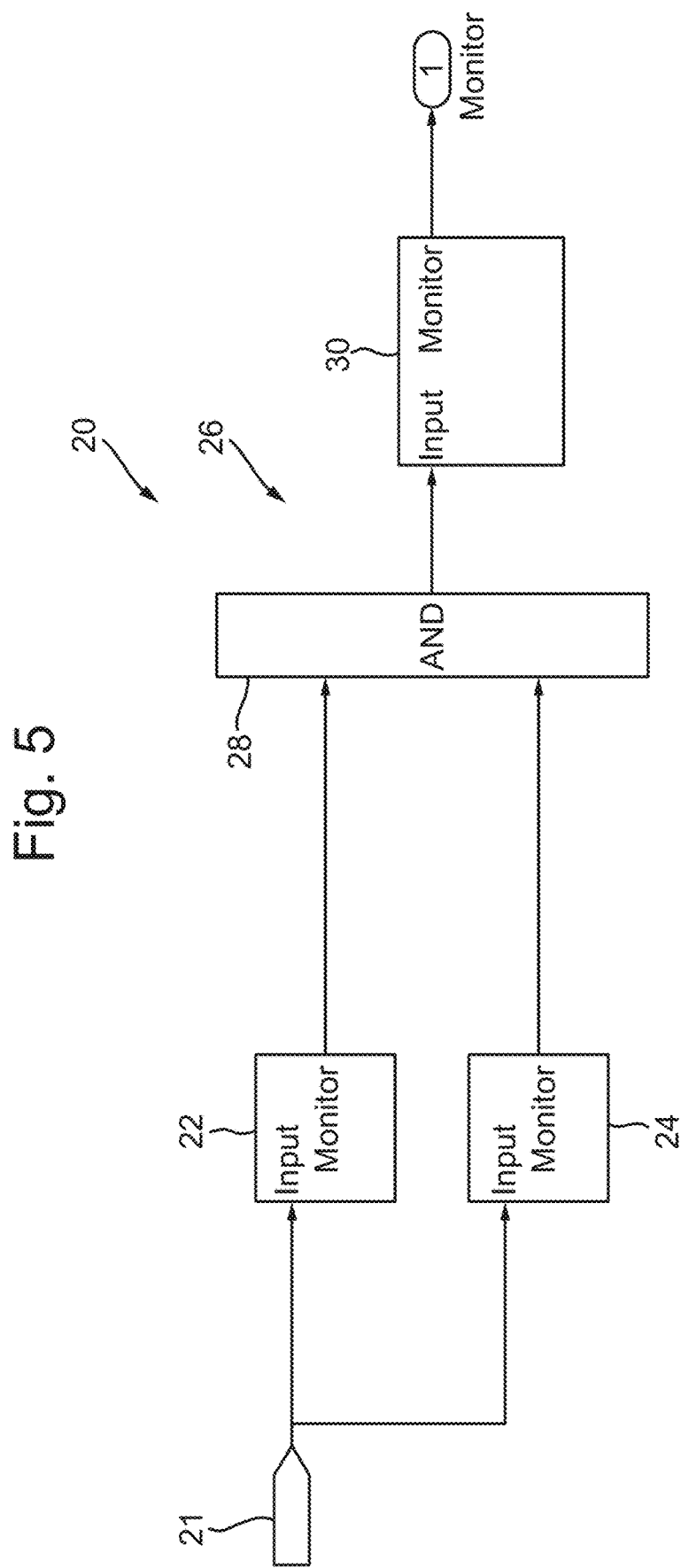

MONITORING SYSTEM FOR IDENTIFYING AN OPERATING STATE OF A MOTOR

FOREIGN PRIORITY

This application claims priority to European Patent Application No. 17197542.8 filed Oct. 20, 2017, the entire contents of which is incorporated herein by reference.

FIELD

The present disclosure relates to a monitoring system for identifying an operating state of a motor, and in particular whether the motor is operating normally or not.

BACKGROUND

Power drive units (PDU) may have multiple input channels such that, should one (or more) channel fail, the failed channel can be shut down, whilst the PDU continues to operate as normal, i.e. whilst providing the same output torque (the torque will remain the same, but the speed will decrease when one channel is shut down). However, when a channel has failed, it may be difficult to determine which channel has failed, because a mechanical connection between channels may cause normally functioning (i.e. non-failed channels) to be affected by the failed channel, causing them to exhibit outputs having a similar pattern to that of a failed channel.

SUMMARY

The present disclosure provides a monitoring system for identifying an operating state of a motor, the system comprising a speed sensor for determining a speed of a motor and providing a speed signal as a function of time in response thereto, and a processor configured to identify a symmetric and/or an asymmetric oscillation of the speed signal as a function of time.

A symmetric oscillation is an oscillation in the speed signal which has substantially the same positive and negative maximum amplitudes with respect to an average value of the speed signal. This may occur when the motor is in a failed or dysfunctional operating state (e.g. operating in a failed PDU channel) and the average value of the speed may be zero. An asymmetric oscillation is an oscillation in the speed signal which has substantially different positive and negative maximum amplitudes with respect to a local average value of the speed signal. This may be determined with respect to a local average value of the speed signal because the average speed signal may vary with time, e.g. when the motor is being ramped up or down in speed. For example, the average speed signal may be determined over a suitable time frame such as one or more oscillation cycles. Such asymmetric oscillations may occur when the motor is in a normally functioning operating state (e.g. in a normal PDU channel), but is mechanically coupled to a motor in a failed or dysfunctional state.

The speed sensor may directly detect the speed of the motor. Alternatively (or additionally), the speed sensor may detect the position of the motor, and determine the speed of the motor therefrom. The speed sensor may then provide the speed signal.

The processor may comprise any suitable means of the determining or identifying a symmetric and/or asymmetric oscillation of the speed signal. Techniques that are known in the art may be used.

The processor may comprise a first monitor, wherein the first monitor compares the speed signal to a first threshold speed, and is configured such that when the speed signal is greater than the first threshold speed, the first monitor counts up at a first count-up rate.

When the speed signal is less than or equal to the first threshold speed, the first monitor may count down at a first count-down rate.

Alternatively, the first monitor may use any other suitable means to count up and down. For example, the first monitor may use an integration algorithm. The integrator may activate when the speed signal is greater than the first threshold speed and decrease the value of the integral when the speed signal is less than or equal to the first threshold speed.

When the first monitor may output a "false" reading when a count of the first monitor is less than a first count threshold, and a "true" reading when the count of the first monitor is greater or equal to the first count threshold.

"True" and "False" may be Boolean outputs, which can be read (i.e. interpreted) and processed by suitable means, such as by a processor. The "True" and "False" readings would be understood to refer to any two labelled readings.

The processor may comprise a second monitor, wherein the second monitor compares the speed signal to a second threshold speed, and is configured such that when the speed signal is more negative than the second threshold speed, the second monitor counts up at a second count-up rate.

When the speed signal is more positive than or equal to the second threshold speed, the second monitor may count down at a second count-down rate.

Alternatively, the second monitor may use any other suitable means to count up and down. For example, the second monitor may use an integration algorithm. The integrator may activate when the speed signal is more negative than the second threshold speed and decrease the value of the integral when the speed signal is more positive than or equal to the second threshold.

The second monitor may output a "false" reading when a count of the second monitor is less than a second count threshold, and a "true" reading when the count of the second monitor is greater than or equal to the second count threshold The count of a monitor refers to the cumulative number of counts (i.e. both up and down) from a start time.

The first count-down rate may be lower than the first count-up rate and/or the second count-down rate may be lower than the second count-up rate.

The first count-up rate may be the same as the second count-up rate and/or the first count-down rate may be the same as the second count-down rate.

The first threshold speed may have a first positive value with respect to an average speed of the signal and the second threshold speed may have a second value that is substantially the same as the first positive value but is negative with respect to the average speed of the signal.

The processor may be configured to determine if the speed signal varies as said symmetric oscillation or said asymmetric oscillation based on the outputs of the first and second monitors.

The processor may identify a symmetric oscillation of the speed signal when the readings of both the first and second monitors are simultaneously "true".

The processor may achieve this by any suitable means such as, for example, by using an AND gate.

The processor may further comprise a counter, wherein the counter counts up when both the first and second monitors output a "true" reading, and identifies a symmetrical oscillation of the speed signal when the count of the counter exceeds a predetermined counter threshold. The counter may be a latched counter, which counts up and down, and the counter latches when the count is greater than a pre-defined number of counts.

The processor may additionally or alternatively detect or identify an asymmetric oscillation of the speed signal. It may do so by comparing the readings of the first and second monitors in any suitable way.

A motor assembly comprising a first motor and the monitoring system of any preceding claim, wherein the speed sensor is arranged for determining a speed of the first motor.

The motor system may include a second motor, a further speed sensor for determining a speed of the second motor and providing a speed signal as a function of time in response thereto, and a processor configured to identify a symmetric and/or an asymmetric oscillation of the speed signal as a function of time.

The motor system may further comprise a gearbox to which the first and second motors are coupled. The gearbox may be a differential gearbox, such as a summing differential gearbox.

The motor system may further comprise a shaft coupled to the first and second motors by the gearbox for enabling the first and/or second motor to drive the shaft.

The present disclosure also provides an actuator or power drive unit comprising the monitoring system or motor assembly as claimed in any preceding claim.

The motor(s) of the actuator may drive the shaft, which may be coupled to a load.

The present disclosure also provides an aerospace primary or secondary flight control system comprising the monitoring system, motor assembly or actuator described herein. For example, the control system may be a high lift system.

The present disclosure also provides a vehicle, such as an aircraft, comprising the monitoring system, motor assembly, actuator, or primary or secondary flight control system described herein.

However, the present disclosure is also applicable to non-aerospace applications that require detection of symmetrical and asymmetrical (i.e. non-symmetrical) failure modes. For example, other engineering sectors such as the automotive industry, or primary actuation in aerospace applications.

The present disclosure is also generally applicable in systems that use an electro-hydraulic servo drive control of the motor, e.g. in a closed loop control.

BRIEF DESCRIPTION OF DRAWINGS

Various embodiments will now be described, by way of example only, and with reference to the accompanying drawings in which:

FIG. 5 shows a monitor system according to the present disclosure;

DETAILED DESCRIPTION

Figure 1:
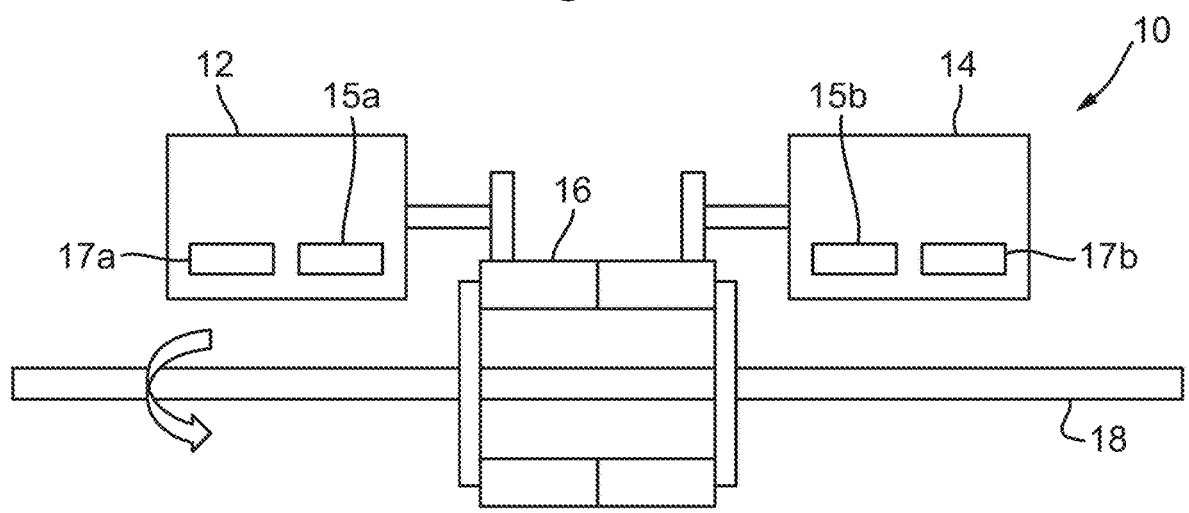
FIG. 1 shows a schematic of a power drive unit (PDU)

FIG. 1 shows a schematic of a power drive unit (PDU) 10 for converting electrical or hydraulic power into rotary motion so as to drive a shaft 18. The PDU 10 has both a first channel 12 and a second channel 14 for driving the shaft 18, such that the system can operate when one of the channels has failed. Each of the first channel 12 and the second channel 14 comprises a motor 17a, 17b coupled to the shaft 18 and may also comprise an electro-hydro servovalve (EHSV), not shown, for controlling its respective motor. The PDU 10 may be part of an aerospace secondary flight control system (such as a high lift system). The PDU 10 may include a speed summing differential gearbox 16 that couples the motors of the channels 12,14 to the shaft 18. The gearbox 16 may be configured such that when it is driven by the motors it causes the output shaft 18 to rotate at an angular speed that is the average of that provided by the motors of the first and second channels 12, 14, multiplied by a gear ratio It will be appreciated that if one of the channels 12,14 fails or malfunctions, but is not shut off, this may adversely affect the motion of the output shaft 18. Such failures or malfunctions may be detected by monitoring the speeds of the motors 17a,17b in the channels 12,14. The PDU 10 therefore comprises motor speed sensors 15a, 15b for sensing the speeds of the motors 17a, 17b. Each motor speed sensor 15a, 15b may detect the speed of the respective motor directly or detect the motor position and use a processor to calculate the motor speed from this. The speed sensor may output a speed signal that is indicative of the speed detected.

Figure 2:
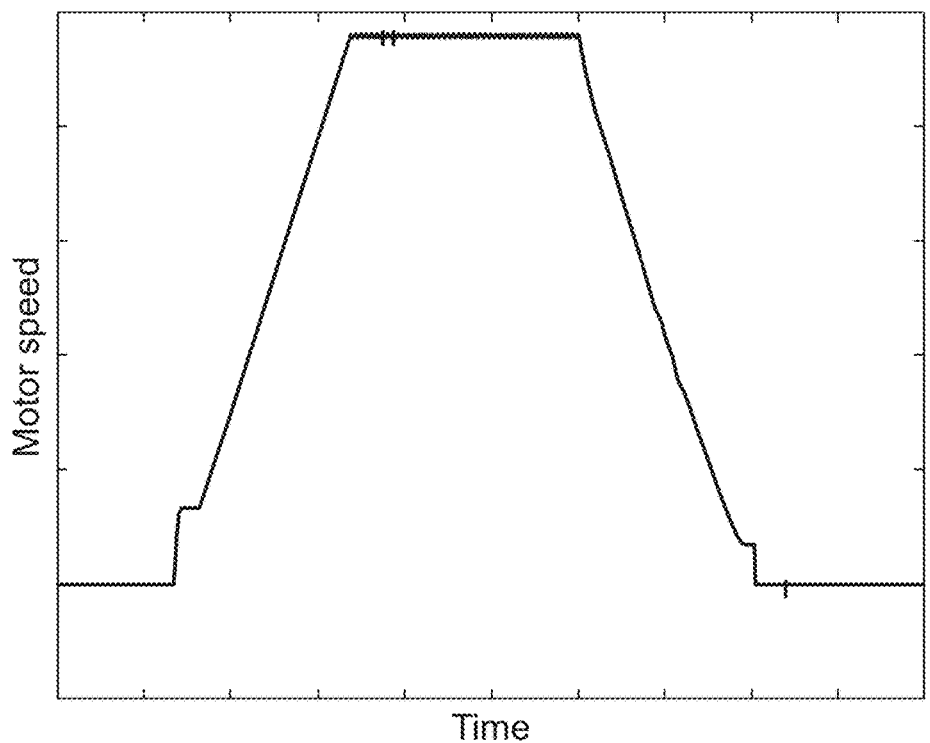
FIG. 2 shows an example of the speed of a motor within the first and/or second channel of the PDU of FIG. 1 during normal operation.

FIG. 2 shows an example of how the speed of a motor within the first and/or second channel 12, 14 of the PDU 10 may vary with time when it is operating normally. The motor speed initially ramps up to a constant speed, and then ramps down again after a desired time period.

Figure 3:
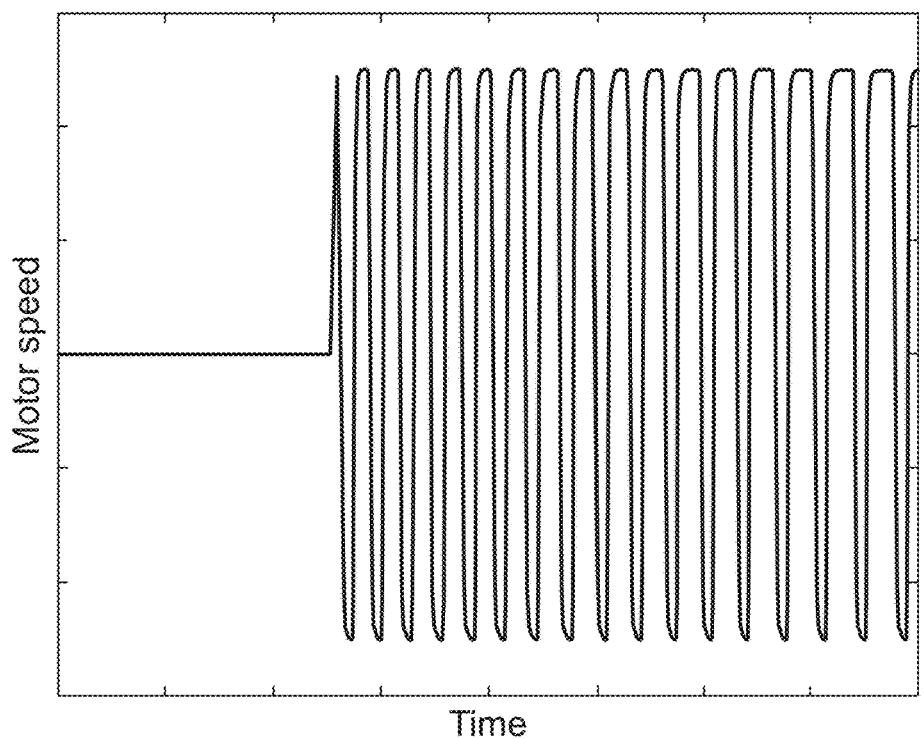
FIG. 3 shows an example of the speed of a motor during oscillatory failure of said motor.

FIG. 3 shows an example of how the speed of a motor within the first and/or second channel 12,14 of the PDU 10 may vary with time when it is in a failure state. This may be caused, for example, due to failure of the EHSV associated with the motor, e.g. when subject to closed loop control. The motor oscillates back and forth such that the motor speed oscillates in a substantially symmetrical manner. The oscillations may therefore be about a zero speed. This may cause premature fatiguing of the system.

When a motor of one of the channels 12,14 is in oscillatory failure (as shown in FIG. 3), the mechanical coupling of the gearbox 16 between the first and second channels 12,14 may cause the other, non-failed motor to also exhibit some oscillations in its speed. This may be prevalent, for example, in systems such as secondary flight control systems.

Figure 4:
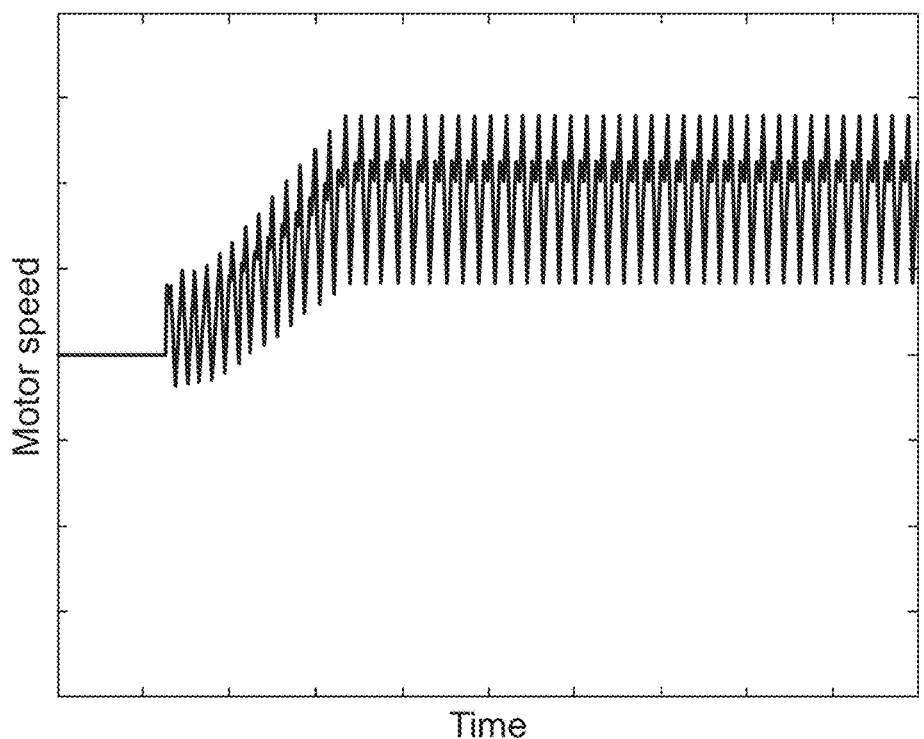
FIG. 4 shows an example of a non-failed motor being affected by a motor in oscillatory failure.

FIG. 4 shows an example of how the speed of a non-failed motor being affected by a motor in oscillatory failure varies with time. In this example, the channels 12,14 are being instructed by their controllers to ramp up their motor speeds and then maintain them at a constant speed. The motor of the normally functioning channel is being directly driven in a single direction in order to achieve this, but the motor of the failed channel oscillates back and forth. The mechanical coupling between the motors by the gearbox 16 results in the oscillating motion of the motor from the failed channel being transmitted to the motor of the normally functioning channel. As such, the speed of the motor of the normally functioning channel also oscillates, substantially about the speed that it is being directly driven to achieve. As the motor of the normal channel is being directly driven in a single direction, but is being oscillated back and forth by the motor of the failed channel, the oscillations in the speed of the motor of the normally functioning channel are significantly asymmetric (with respect to the mean speed that the motor of the normal channel is being directed to achieve). This is in contrast to the oscillations of the motor of the failed channel, which are substantially symmetric about a zero speed.

When a channel 12,14 has failed, it may be desired for it to be shut down (i.e. turned off) so that the motor does not drive the gearbox 16, allowing the system to continue to operate in a normal manner, i.e. with the same level of output torque, but at a reduced speed. As the speed summing differential gearbox 16 may average the speed of the two channels 12,14, when there is only one input channel, the speed output to the shaft 18 may be simply the speed output of the non-failed channel (multiplied by the gear ratio). However, it is necessary to determine which of the channels 12,14 is the failed channel in order to shut it down. It may therefore be necessary to detect the speeds of the motors and differentiate between the symmetric and asymmetric speed oscillations associated with the failed channel and the non-failed channel respectively.

FIG. 5 shows a monitoring system 20 comprising a processor 26 having a first monitor 22 and a second monitor 24 for monitoring and processing the speed signal 21 to determine or identify symmetric or asymmetric oscillations thereof. The first monitor 22 may process the input speed signal 21, and provide an output based thereon (as will be discussed further below). The second monitor 22 may process the input speed signal 21, in a different manner, and provide an output based thereon (as will be discussed further below). The outputs may be "Boolean" outputs, i.e. comprising a "True" or "False" output. The processor 26 may compare the outputs from the first and second monitors 22, 24. The processor 26 may comprise an AND gate 28. The outputs of the first and second monitors 22,24 may pass through the AND gate. The AND gate may output a "true" value when both the first and second monitors 22,24 output a "true" reading. In order to reduce "false" readings due to noise, the output from the AND gate may input into a latched counter 30. Once the latched counter 30 reaches a predetermined latched counter threshold, the latched counter will have an output indicative of a motor speed having a symmetrical oscillation.

The first monitor 22 may compare the speed signal, which is indicative of the speed of a motor, to a predetermined threshold speed. The first monitor may comprise a first counter. When the speed is greater than the threshold speed, the first counter may count-up at a first count-up rate. When the speed is less than or equal to the threshold speed, the first counter may count-down at a first count-down rate. When the count of the first counter is higher than a predetermined first count threshold, the first monitor 22 may output a "true" reading. When the count is lower than or equal to the first count threshold, the first monitor may output a "false" reading. The first count-down rate may be slower than the first count-up rate. This may be useful in the oscillatory failure mode wherein the motor speed exceeds the first threshold for a shorter duration than it is below it. As the count-down rate is lower than the count-up rate this allows the counter to progressively count up over time, instead of clearing during every oscillatory cycle of the oscillatory failure mode.

Figure 6A:
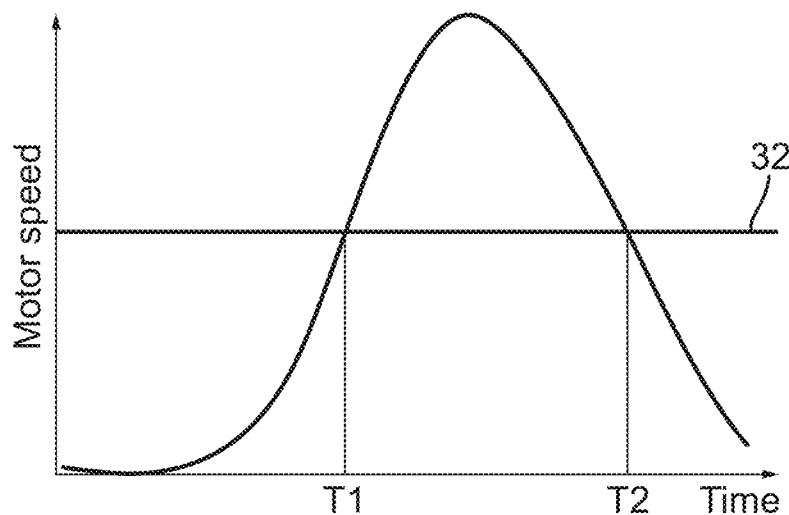
FIGS. 6A and 6B show an example of the monitoring of a speed oscillation according to the present disclosure.
Figure 6B:
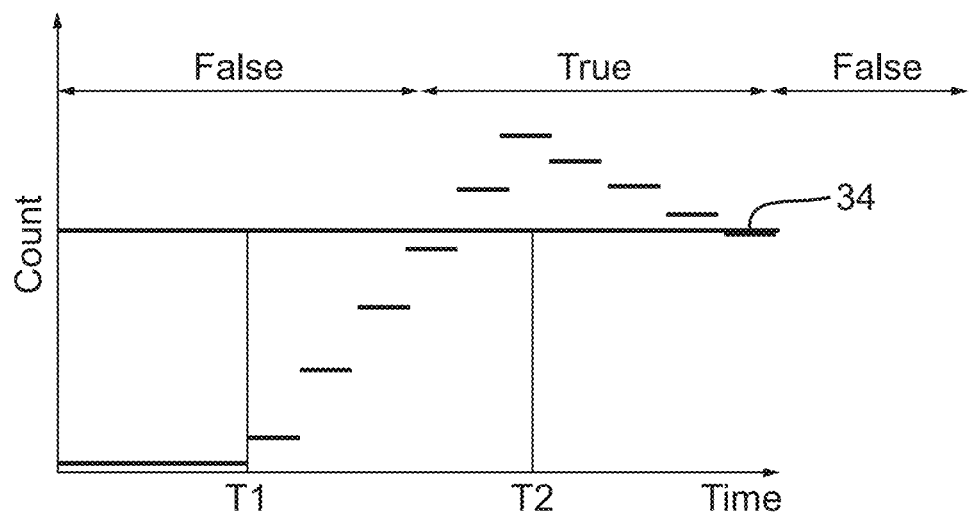

FIGS. 6A and 6B show an example of how the first monitor monitors a motor speed during part of a speed oscillation. The monitor initially outputs a "false" reading. At time T1, the speed may have increased during the oscillation so as to exceed a predefined first threshold speed 32 (shown in FIG. 6A), and the monitor may begin to count-up at a first count-up rate (shown in FIG. 6B). Once the count exceeds the count threshold 34 the monitor may output a "true" reading. At time T2, the motor speed may drop below the threshold speed 32 (shown in FIG. 6A), and the monitor may begin to count down at a first count-down rate (shown in FIG. 6B). The first count-down rate may be slower than the first count-up rate. The output of the monitor may initially remain "true", since the count may remain above the count threshold (as shown in FIG. 6B). Once the count drops below the count threshold 34 the monitor may return to outputting a "false" reading.

The second monitor 24 may compare the speed signal, to a second predetermined threshold speed, wherein the second threshold speed is lower than or in the opposite direction to (i.e. more negative than) the first threshold speed. Indeed, the second threshold speed may be the negative of the first threshold speed (i.e. the same speed in the opposite direction). The second monitor 24 is designed to monitor when the speed drops below (i.e. is more negative than) this second threshold speed, and functions in the same way as the first monitor 22, i.e. when the speed is less than the second threshold speed as opposed to when the speed is greater than the first threshold speed.

Figure 7A:
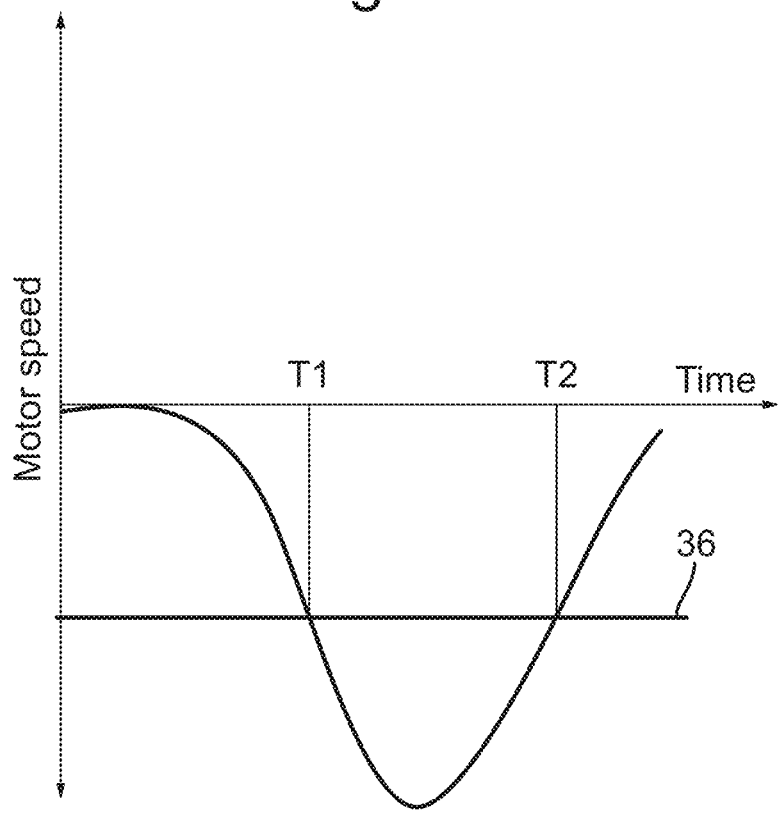
FIGS. 7A and 7B show an example of how the second monitor monitors a motor speed during a speed oscillation.
Figure 7B:
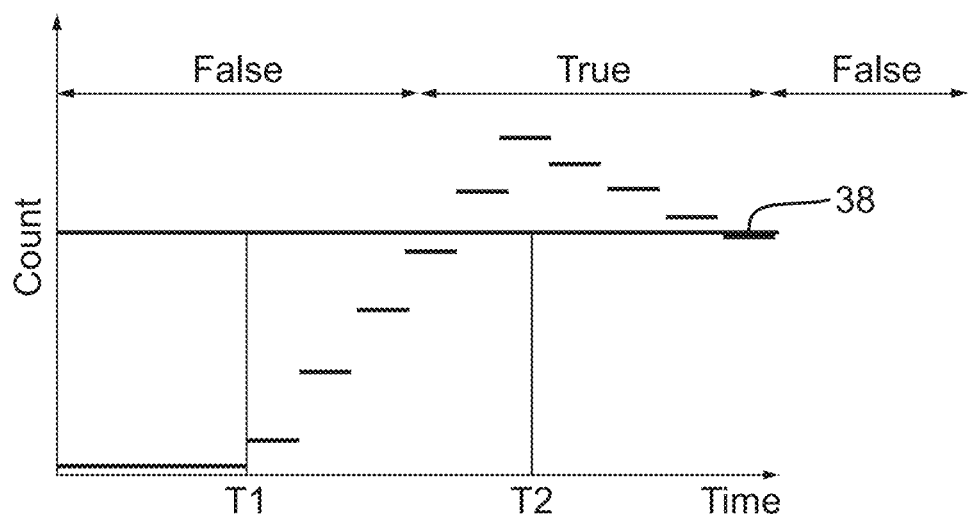

FIGS. 7A and 7B show an example of how the second monitor monitors a motor speed during a speed oscillation. The second monitor may function in the same manner as the first monitor discussed with respect to FIGS. 6A and 6B, except that the monitor may begin to count up at a second count-up rate (shown in FIG. 7B) when the speed is less than (more negative than) the second threshold speed 36 (shown in FIG. 7A), and the monitor may begin to count down at a second count-down rate (shown in FIG. 7B) when the speed is equal to or greater than (less negative than) the second threshold speed (shown in FIG. 7A).

Referring again to FIG. 5, the AND gate may output a "true" valve when the speed has exceeded both the first and second threshold speeds consistently. Otherwise, the AND gate may output a "false" value or reading. The speed exceeding both the first and second threshold speeds is indicative of a symmetrical oscillation, since the speed is reaching limits (i.e. thresholds) in both directions about the mean speed consistently. Thus, "true" reading from the processor may be indicative of the motor speed having a symmetrical oscillation. If an asymmetric oscillation is present, only one of the first and second threshold speeds will be regularly exceeded and, thus, only one of the first and second counters may reach the threshold count, and thus only one of the first and second monitors may output a "true" reading (i.e. the other of the first and second monitors may output a "false" reading). Thus, the AND gate may output a "false" reading when an asymmetrical oscillation is present. The first and second threshold values are predetermined, and may be set based on the symmetric and asymmetric oscillatory failure modes of the channel, i.e. such that the above function is achieved.

The monitor confirms detection when both the first and second monitors 22,24 have exceeded the respective thresholds for predetermined lengths of time. This identifies a channel having a symmetrical speed oscillation output, which is a failed channel which can then be identified and hence shut down. As discussed above, in an asymmetric oscillation mode, only one of the first and second monitors 22,24 will exceed the required thresholds for lengths of time and, thus, a channel in the mode will not be incorrectly identified as being a failed channel.

The invention claimed is:

1. A motor assembly comprising:
a first motor and a second motor, wherein the first motor is mechanically coupled to the second motor; and
a monitoring system for identifying an operating state of the first motor or the second motor, the monitoring system comprising
a speed sensor for determining a speed of the first motor and providing a speed signal as a function of time in response thereto; and
a processor configured to identify that the first motor is in a failed state by identifying a symmetric oscillation of the speed signal, with respect to its average value, as a function of time; or to identify that the second motor is in a failed state by identifying an asymmetric oscillation of the speed signal, with respect to its average value, as a function of time.

2. The motor assembly of claim 1, wherein the processor comprises a first monitor, wherein the first monitor compares the speed signal to a first threshold speed, and is configured such that when the speed signal is greater than the first threshold speed, the first monitor counts up at a first count-up rate.

3. The motor assembly of claim 2, wherein when the speed signal is less than or equal to the first threshold speed, the first monitor counts down at a first count-down rate.

4. The motor assembly of claim 2, wherein the first monitor outputs a "false" reading when a count of the first monitor is less than a first count threshold, and a "true" reading when the count of the first monitor is greater or equal to the first count threshold.

5. The motor assembly of claim 2, wherein the processor comprises a second monitor, wherein the second monitor compares the speed signal to a second threshold speed, and is configured such that when the speed signal is more negative than the second threshold speed, the second monitor counts up at a second count-up rate.

6. The motor assembly of claim 5, wherein when the speed signal is more positive than or equal to the second threshold speed, the second monitor counts down at a second count-down rate.

7. The motor assembly of claim 5, wherein the second monitor outputs a "false" reading when a count of the second monitor is less than a second count threshold, and a "true" reading when the count of the second monitor is greater than or equal to the second count threshold.

8. The motor assembly of claim 7, wherein the first threshold speed has a first positive value with respect to an average speed of the signal and the second threshold speed has a second value that is substantially the same as the first positive value but is negative with respect to the average speed of the signal.

9. The motor assembly of claim 8, wherein the processor is configured to determine if the speed signal varies as said symmetric oscillation or said asymmetric oscillation based on the outputs of the first and second monitors.

10. The motor assembly of claim 8, wherein the processor identifies a symmetric oscillation of the speed signal when the readings of both the first and second monitors are simultaneously "true".

11. The motor assembly of claim 10, wherein the processor further comprises a counter, wherein the counter counts up when both the first and second monitors output a "true" reading, and identifies a symmetrical oscillation of the speed signal when the count of the counter exceeds a predetermined counter threshold.

12. The motor assembly of claim 1, wherein the motor assembly comprises:
a further speed sensor for determining a speed of the second motor and providing a second speed signal as a function of time in response thereto, and
a processor configured to identify that the second motor is in a failed state by identifying a symmetric oscillation of the second speed signal, with respect to its average value, as a function of time; or to identify that the first motor is in a failed state by identifying an asymmetric oscillation of the second speed signal, with respect to its average value, as a function of time.

13. The motor assembly of claim 12, further comprising:
a gearbox to which the first and second motors are coupled and a shaft coupled to the first and second motors by the gearbox for enabling the first and/or second motor to drive the shaft.

14. A monitoring system for identifying an operating state of a motor, the system comprising:
a speed sensor for determining a speed of a motor and providing a speed signal as a function of time in response thereto; and
a processor configured to identify a symmetric and/or an asymmetric oscillation of the speed signal as a function of time;
wherein the processor comprises a first monitor, wherein the first monitor compares the speed signal to a first threshold speed, and is configured such that when the speed signal is greater than the first threshold speed, the first monitor counts up at a first count-up rate.

15. A motor assembly comprising
a first motor and a second motor; and
a monitoring system for identifying an operating state of the first motor, the monitoring system comprising:
a speed sensor for determining a speed of the first motor and providing a first speed signal as a function of time in response thereto, a processor configured to identify a symmetric and/or an asymmetric oscillation of the first speed signal as a function of time; and
a further speed sensor for determining a speed of the second motor and providing a second speed signal as a function of time in response thereto, and a processor configured to identify a symmetric and/or an asymmetric oscillation of the second speed signal as a function of time.

* * * * *